US011250521B2

United States Patent
Iley (10) Patent No.: US 11,250,521 B2
(45) Date of Patent: Feb. 15, 2022

(54) SYSTEM FOR FACILITATING RECONCILIATION AND CORRELATION OF WORKFLOWS

(71) Applicant: BANK OF AMERICA CORPORATION, Charlotte, NC (US)

(72) Inventor: Dean Alan Iley, Chesapeake, VA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 238 days.

(21) Appl. No.: 16/598,643

(22) Filed: Oct. 10, 2019

(65) Prior Publication Data

US 2021/0110486 A1   Apr. 15, 2021

(51) Int. Cl.
  *G06F 3/00* (2006.01)
  *G06Q 40/00* (2012.01)
  *G06Q 20/42* (2012.01)
  *G06F 9/54* (2006.01)

(52) U.S. Cl.
  CPC .......... *G06Q 40/128* (2013.12); *G06F 9/541* (2013.01); *G06F 9/542* (2013.01); *G06Q 20/42* (2013.01)

(58) Field of Classification Search
  CPC ................................ G06F 9/541; G06F 9/542
  USPC ....................................................... 719/320
  See application file for complete search history.

(56) References Cited

U.S. PATENT DOCUMENTS

| | | | | |
|---|---|---|---|---|
| 6,223,185 B1* | 4/2001 | Berkland | ................ | G06F 9/465 |
| 8,898,676 B2* | 11/2014 | Hiltgen | ............... | G06F 9/45558 |
| | | | | 718/106 |
| 2004/0039728 A1* | 2/2004 | Fenlon | .................... | H04L 43/00 |
| 2006/0005162 A1* | 1/2006 | Tseng | ....................... | G06F 8/64 |
| | | | | 717/107 |
| 2008/0163172 A1* | 7/2008 | Rossmann | .............. | G06F 8/656 |
| | | | | 717/121 |
| 2008/0276253 A1* | 11/2008 | Khandrika | .............. | G06F 9/542 |
| | | | | 719/318 |
| 2014/0344799 A1* | 11/2014 | Thodati | .................. | G06F 8/654 |
| | | | | 717/171 |

OTHER PUBLICATIONS

Christian Poellabauer, Cooperative Run-time Management of Adaptive Applications and Distributed Resources. (Year: 2002).*
Andrew F. Hayes, Process: A Versatile Computational Tool for Observed Variable Mediation, Moderation, and Conditional Process Modeling. (Year: 2012).*

* cited by examiner

*Primary Examiner* — Lechi Truong
(74) *Attorney, Agent, or Firm* — Moore & Van Allen PLLC; Nicholas C. Russell (57) ABSTRACT

Embodiments of the present invention provide a system for facilitating reconciliation and correlation of work flows. The system is configured for identifying one or more applications associated with an operation, identifying relationships between each of the one or more applications, generating a matrix comprising the relationships between each of the one or more applications, receiving one or more entries from the one or more applications, storing the one or more entries in a ledger, and generating a single reconciliation file combining the one or more entries and the relationships.

8 Claims, 6 Drawing Sheets

SYSTEM FOR FACILITATING RECONCILIATION AND CORRELATION OF WORKFLOWS

BACKGROUND

Typically, multiple applications are utilized for different workflows that complete an operation. However, using multiple applications that share data, records, files, or the like need a system in place that reconciles each of the applications. Conventional systems do not effectively reconcile and correlate workflows, thereby resulting in inconsistencies. Moreover, it is difficult to verify whether the achieved goal is accurate. As such, there exists a need for a system to reconcile and correlate workflows effectively.

SUMMARY

Embodiments of the present invention address the above needs and/or achieve other advantages by providing apparatuses (e.g., a system, computer program product and/or other devices) and methods for reconciliation and correlation of work flows. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may identify one or more applications associated with an operation, identify relationships between each of the one or more applications, generate a matrix comprising the relationships between each of the one or more applications, receive one or more entries from the one or more applications, store the one or more entries in a ledger, and generate a single reconciliation file combining the one or more entries and the relationships.

In some embodiments, the present invention receives the relationships from each of the one or more applications.

In some embodiments, the present invention automatically identifies the relationships associated with the one or more applications based on crawling into each of the one or more applications.

In some embodiments, the present invention identifies one or more discrepancies based on the one or more entries received from the one or more applications and generates and transmits an alert to at least one user, wherein the alert is associated with the one or more discrepancies.

In some embodiments, the present invention performs one or more actions to mitigate the one or more discrepancies.

In some embodiments, the present invention transmits the single reconciliation file to one or more users.

In some embodiments, the one or more entries are associated with actions performed by each of the one or more applications.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Typically, an entity may use multiple applications to complete an operation. Using multiple applications that share common files, databases, records, data, or the like need a system in place that reconciles each of the applications. Current conventional systems do not effectively reconcile each of the applications. Conventional systems do not effectively reconcile the applications. Some conventional systems have the applications validate each other. However, each application validating every other application is not an efficient process. Additionally, it is difficult for the users of the applications to validate whether the objective achieved by all the applications that are working together is accurate. As such, there exists a need for a system to effectively validate each of the applications used within an entity.

The system of the present invention solves the above problem by creating a central point of reconciliation to manage all the actions performed by each of the applications and allow users to validate the accuracy of the objective achieved by all the applications. The process performed by the system is explained using an example of FDIC insurance calculation. Although the invention is explained in terms of FDIC insurance calculation, it should be understood that the process described herein may be applied to any other workflows where multiple applications are used to achieve an objective.

In some embodiments of the invention, the terms "entity" may include any organization that processes financial transactions including, but not limited to, banks, credit unions, savings and loan associations, investment companies, stock brokerages, resource management firms, insurance companies and the like. In some embodiments, the "entity" may not be a financial institution. Furthermore, embodiments of the present invention use the term "user." It will be appreciated by someone with ordinary skill in the art that the user may be any user of the applications provided by the entity. As used herein, the term application may be any software application.

Figure 1:
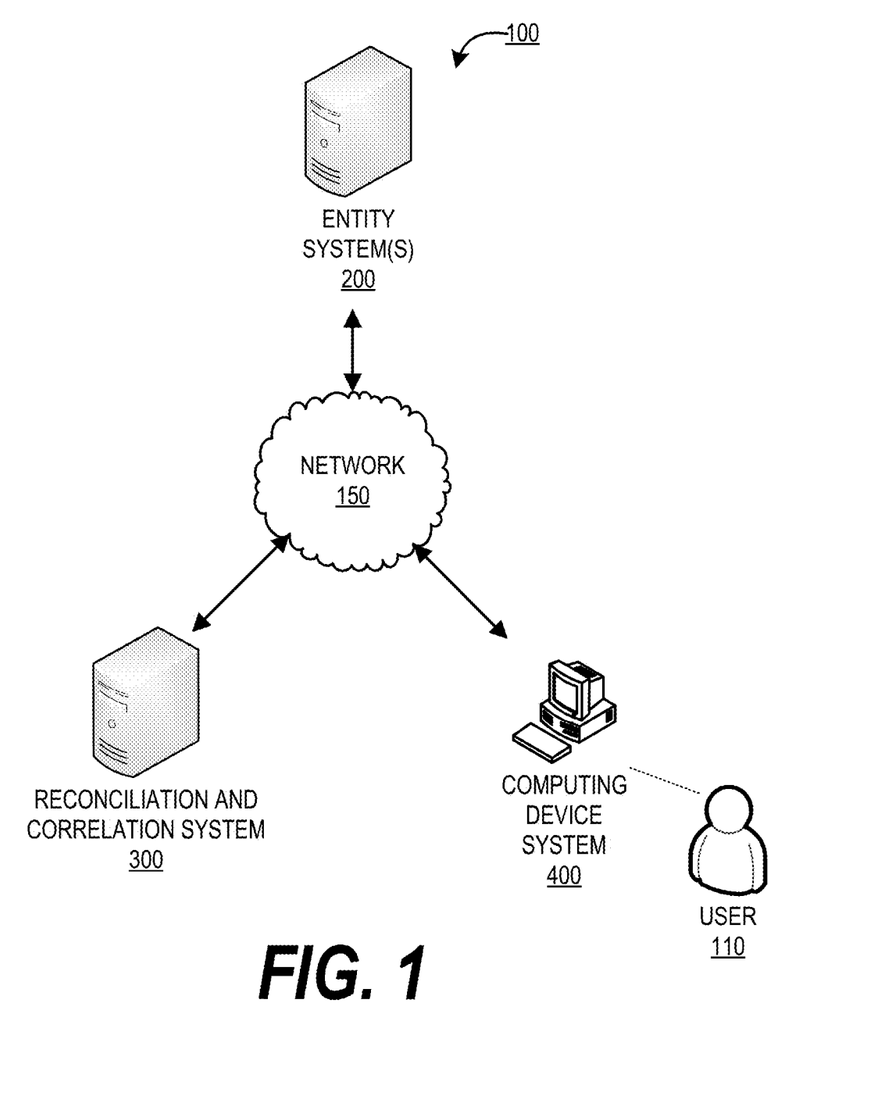
FIG. 1 provides a block diagram illustrating a system environment for facilitating reconciliation and correlation of workflows, in accordance with an embodiment of the invention.

FIG. 1 provides a block diagram illustrating a system environment 100 for facilitating reconciliation and correlation of work flows, in accordance with an embodiment of the invention. As illustrated in FIG. 1, the environment 100 includes a reconciliation and correlation system 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be users of applications associated with the entity. The entity system(s) 200 may be any system owned or otherwise controlled by an entity to support or perform one or more process steps described herein.

The reconciliation and correlation system 300 is a system of the present invention for performing one or more process steps described herein. In some embodiments, the reconciliation and correlation system 300 may be an independent system. In some embodiments, the reconciliation and correlation system 300 may be a part of the entity system 200.

The reconciliation and correlation system 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the reconciliation and correlation system 300 is configured to communicate information or instructions with the entity system 200, and/or the computing device system 400 across the network 150.

The computing device system 400 may be a computing device of the user 110. In general, the computing device system 400 communicates with the user 110 via a user interface of the computing device system 400, and in turn is configured to communicate information or instructions with the reconciliation and correlation system 300, and/or entity system 200 across the network 150.

Figure 2:
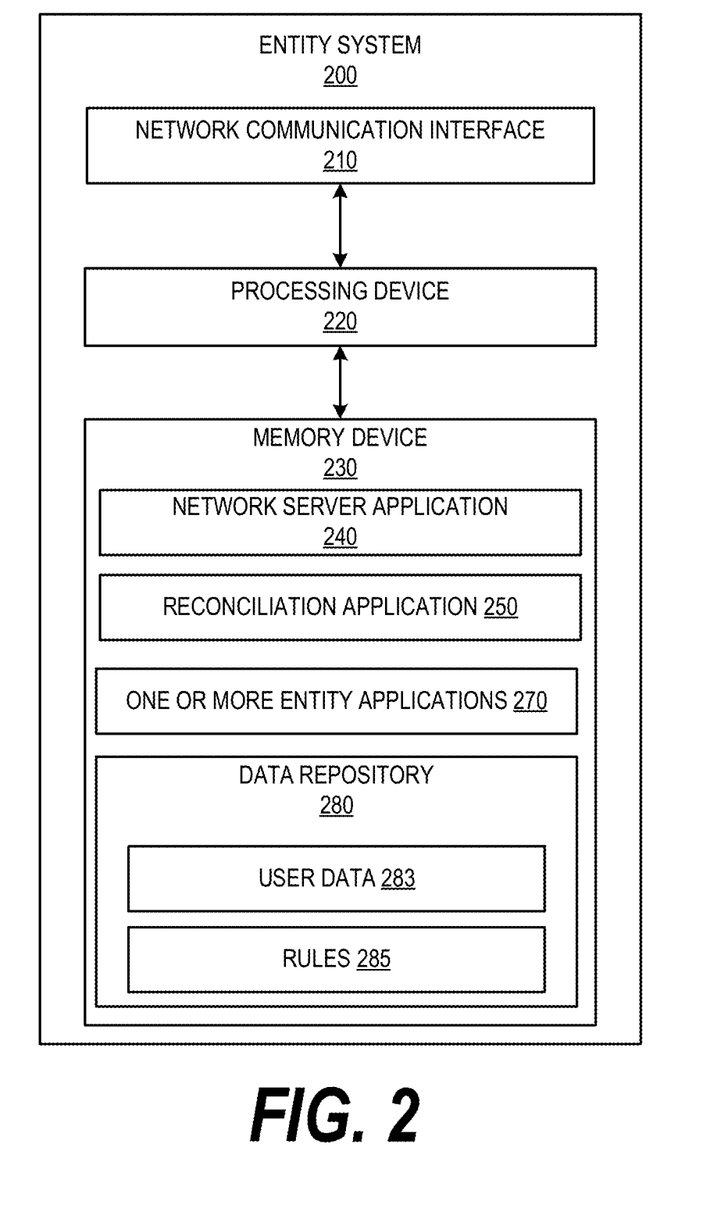
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a reconciliation application 250, one or more entity applications 270, and a data repository 280 comprises user data 283 and rules 285. The computer-executable program code of the network server application 240, the reconciliation application 250, and the one or more entity applications 270 to perform certain logic, data-extraction, and data-storing functions of the entity system 200 described herein, as well as communication functions of the entity system 200. In some embodiments, the reconciliation application 250 allows the reconciliation and correlation system 300 to communicate with the entity system 200 to perform one or more steps described herein. The one or more entity applications may be any application utilized by the entity system 200 to perform one or more operations.

The network server application 240, the reconciliation application 250, and the one or more entity applications 270 are configured to store data in the data repository 280 or to use the data stored in the data repository 280 when communicating through the network communication interface 210 with the reconciliation and correlation system 300, and/or the computing device system 400 to perform one or more process steps described herein. In some embodiments, the entity system 200 may receive instructions from the reconciliation and correlation system 300 via the reconciliation application 250 to perform certain operations. The reconciliation application 250 may be provided by the reconciliation and correlation system 300. The one or more entity applications 270 may be any of the applications used, created, modified, and/or managed by the entity system 200 to perform one or more operations. For example, the entity application may be any of the applications described in FIG. 6.

Figure 3:
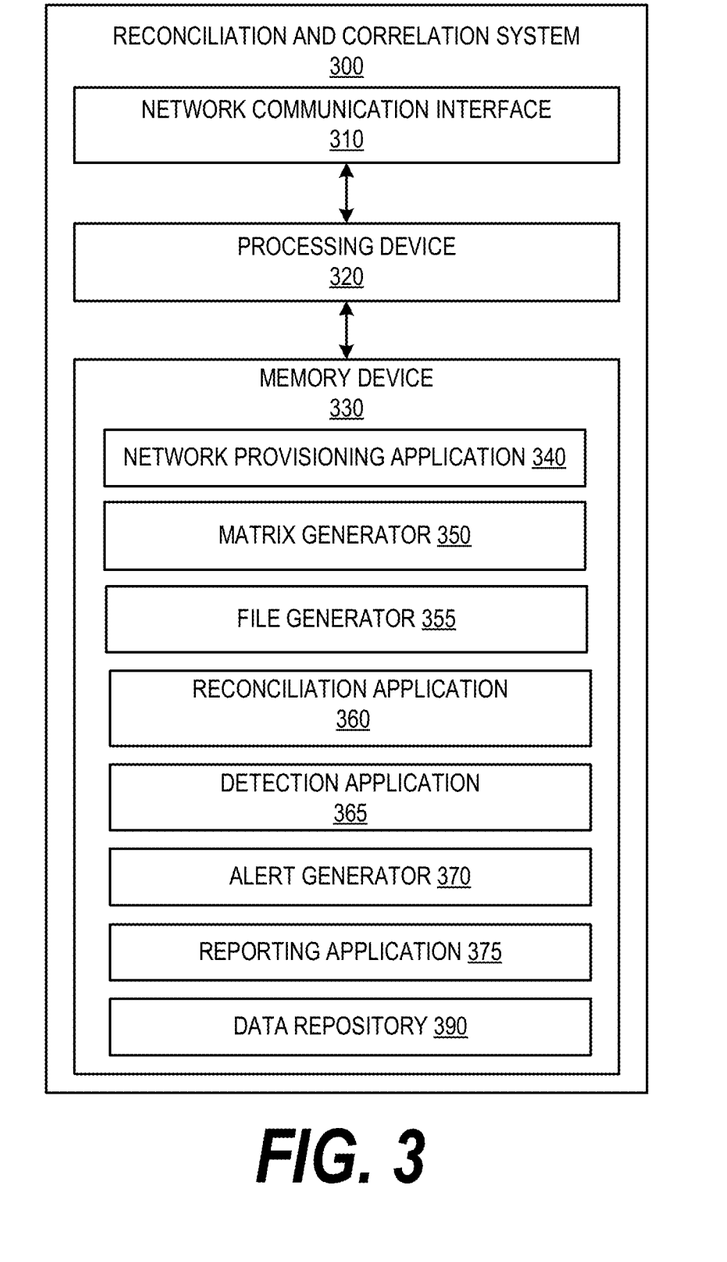
FIG. 3 provides a block diagram illustrating a reconciliation and correlation system 300 of FIG. 1, in accordance with an embodiment of the invention.

FIG. 3 provides a block diagram illustrating the reconciliation and correlation system 300 in greater detail, in accordance with embodiments of the invention. As illustrated in FIG. 3, in one embodiment of the invention, the reconciliation and correlation system 300 includes one or more processing devices 320 operatively coupled to a network communication interface 310 and a memory device 330. In certain embodiments, the reconciliation and correlation system 300 is operated by the entity. In some embodiments, the reconciliation and correlation system 300 is owned or operated by the entity of the entity system 200. In some embodiments, the reconciliation and correlation system 300 may be an independent system. In alternate embodiments, the reconciliation and correlation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the reconciliation and correlation system 300 described herein. For example, in one embodiment of the reconciliation and correlation system 300, the memory device 330 includes, but is not limited to, a network provisioning application 340, a matrix generator 350, a file generator 355, a reconciliation application 360, a detection application 365, an alert generator 370, a reporting application 375, and a data repository 390 comprising data processed or accessed by one or more applications in the memory device 330. The computer-executable program code of the network provisioning application 340, the matrix generator 350, the file generator 355, the reconciliation application 360, the detection application 365, the alert generator 370, and the reporting application 375 may instruct the processing device 320 to perform certain logic, data-processing, and data-storing functions of the reconciliation and correlation system 300 described herein, as well as communication functions of the reconciliation and correlation system 300.

The network provisioning application 340, the matrix generator 350, the file generator 355, the reconciliation application 360, the detection application 365, the alert generator 370, and the reporting application 375 are configured to invoke or use the data in the data repository 390 when communicating through the network communication interface 310 with the entity system 200, and/or the computing device system 400. In some embodiments, the network provisioning application 340, the matrix generator 350, the file generator 355, the reconciliation application 360, the detection application 365, the alert generator 370, and the reporting application 375 may store the data extracted or received from the entity system 200, and the computing device system 400 in the data repository 390. In some embodiments, the network provisioning application 340, the matrix generator 350, the file generator 355, the reconciliation application 360, the detection application 365, the alert generator 370, and the reporting application 375 may be a part of a single application. One or more processes performed by the network provisioning application 340, the matrix generator 350, the file generator 355, the reconciliation application 360, the detection application 365, the alert generator 370, and the reporting application 375 are described in detail below.

Figure 4:
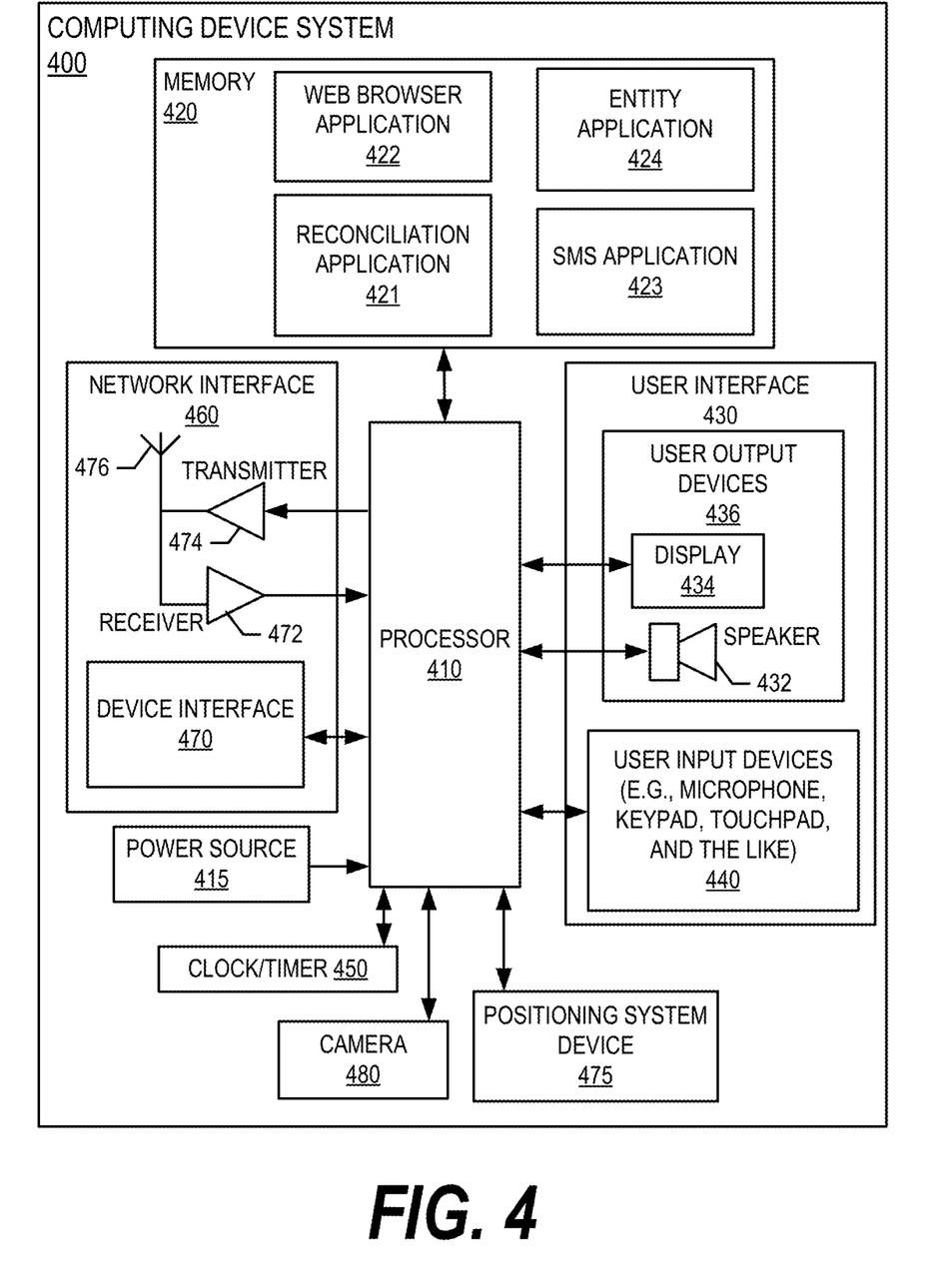
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a reconciliation application 421, an entity application 424, or the like. These applications also typically instructions to a graphical user interface (GUI) on the display 430 that allows the user 110 to interact with the entity system 200, the reconciliation and correlation system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the reconciliation application 421 is provided by the reconciliation and correlation system 300. In some embodiments, the entity application 424 may be any application utilized by the entity system 200 to perform one or more operations.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
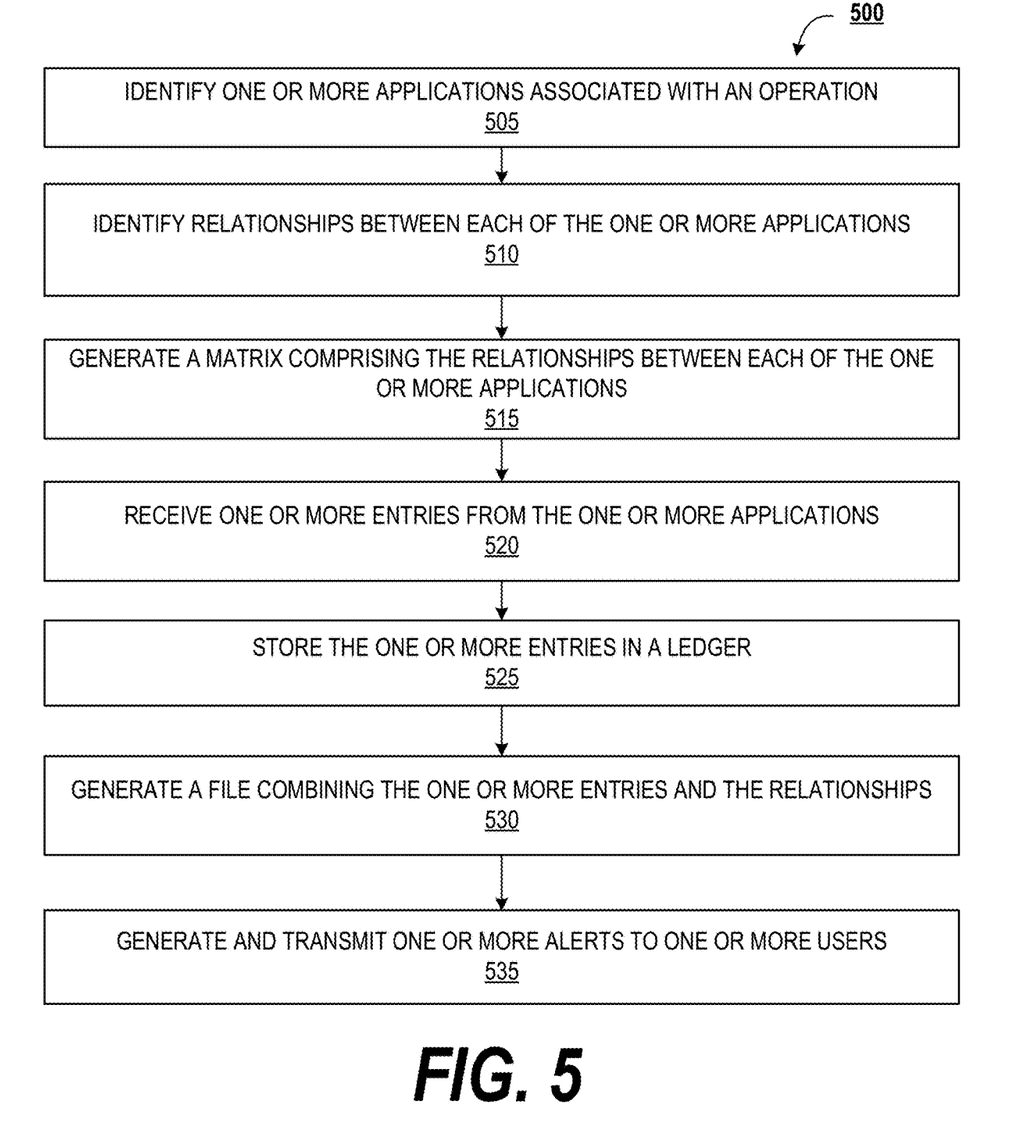
FIG. 5 provides a flowchart illustrating a process flow for facilitating reconciliation and correlation of workflows, in accordance with an embodiment of the invention.

FIG. 5 provides a flowchart illustrating a process flow 500 for facilitating reconciliation and correlation of workflows, in accordance with an embodiment of the invention. As shown in block 505, the system identifies one or more applications associated with an operation. The operation may be any objective that the entity has to achieve. For example, one or more applications may work together to achieve a final goal. One such example is described in FIG. 6 in detail.

As shown in block 510, the system identifies relationships between each of the one or more applications. In some embodiments, the system identifies the relationships between each of the one or more applications based on crawling into each of the one or more applications. For example, the system may crawl into each of the one or more applications to identify attributes that define the relationship of an application with other applications. In some embodiments, the system receives the relationships from each of the one or more applications.

As shown in block 515, the system generates a matrix comprising the relationships between each of the one or more applications. The matrix generated by the system is used for reconciling multiple workflows that are associated with the one or more applications. There may be multiple workflows that are associated with each of the applications that are performed in parallel. For example, a first application may work with a second application to complete a first workflow and the first application may work with a third application to complete a second workflow in parallel.

As shown in block 520, the system receives one or more entries from the one or more applications. The one or more entries are associated with one or more actions performed by each of the one or more applications.

As shown in block 525, the system stores the one or more entries in a ledger. The system maintains a ledger that comprises the one or more actions performed by each of the one or more applications.

As shown in block 530, the system generates a file combining the one or more entries and the relationships. The file may be a single reconciliation file that documents each of the one or more actions performed by each of the one or more applications. In some embodiments, the single reconciliation file comprises one or more tables. In some embodiments, the single reconciliation file comprises a summarized view of the actions performed by each of the one or more applications. In some embodiments, the system may generate the single reconciliation file and may transmit the reconciliation file to one or more users.

In some embodiments, the system identifies one or more discrepancies based on the one or more entries received from the one or more applications. As shown in block 535, the system generates and transmits one or more alerts to one or more users. In response to identifying one or more discrepancies, the system may generate and transmit alerts to the one or more users that manage the one or more applications. For example, the system may identify that a first application is associated with a discrepancy and may transmit an alert to a first user that manages the first application. In some embodiments, the system may perform one or more steps to mitigate the effects of one or more discrepancies.

Figure 6:
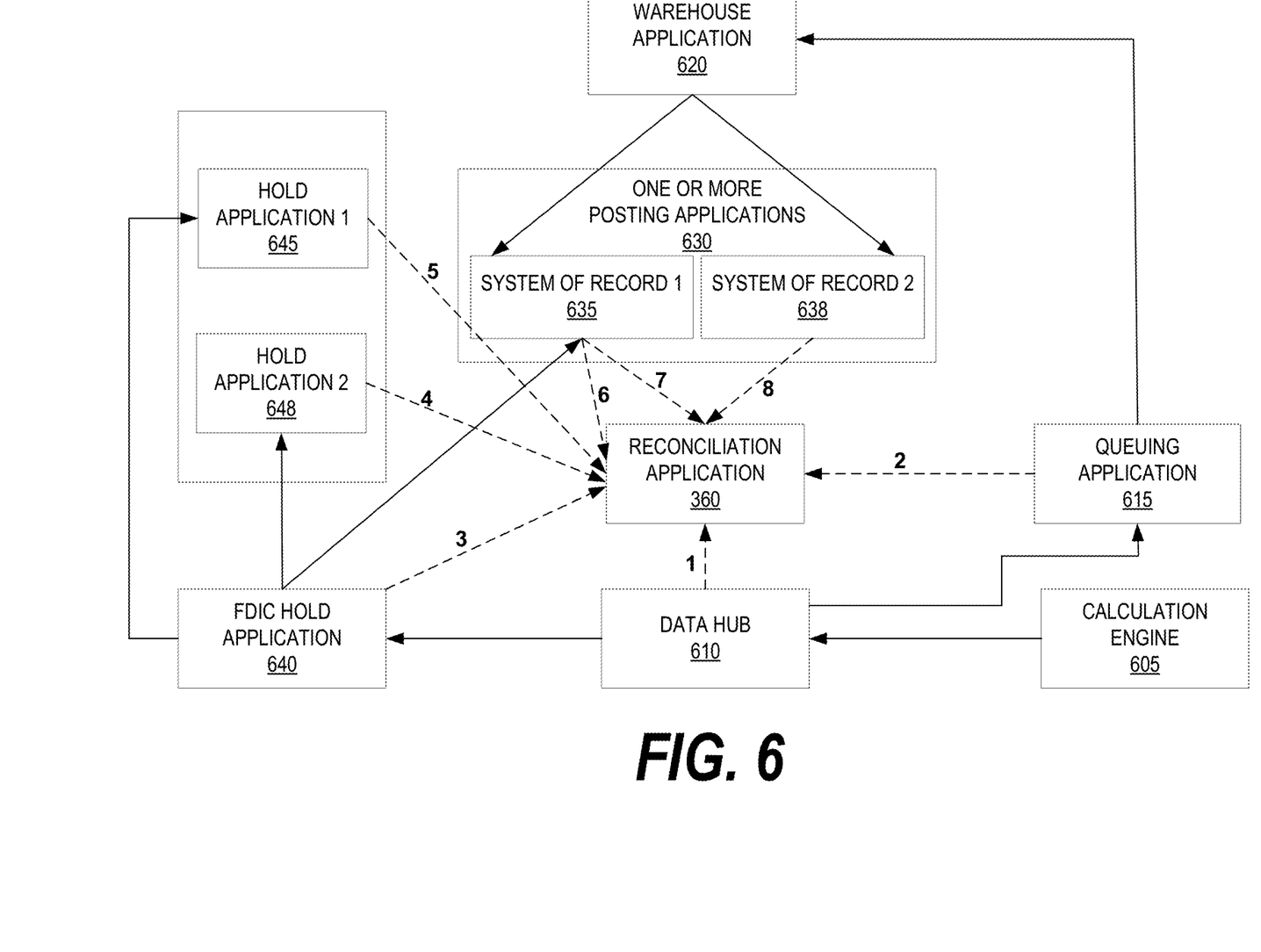
FIG. 6 provides a block diagram illustrating an example of the process flow for facilitating reconciliation and correlation of workflows, in accordance with an embodiment of the invention.

FIG. 6 provides a block diagram 600 illustrating an example of the process flow for facilitating reconciliation and correlation of workflows, in accordance with an embodiment of the invention. Block diagram 600 illustrates an exemplary embodiment where the system of the present invention reconciles multiple applications used by an entity to calculate FDIC insurance to comply with the Federal Deposit Insurance Corporation (FDIC) regulation. FDIC introduced the "Recordkeeping for Timely Deposit Insurance Determination" rule that requires each insured depository institution that has two million or more deposit accounts to configure its information technology system to be capable of calculating the insured and uninsured amount in each deposit account by ownership right and capacity, which would be used by the FDIC to make deposit insurance determinations in the event of the institution's failure, and to maintain complete and accurate information needed by the FDIC to determine deposit insurance coverage with respect to each deposit account, except as otherwise provided.

To comply with the FDIC regulation, an entity may have multiple applications in place. In some embodiments, the multiple applications comprise a calculation engine 605, a data hub 610, a queuing application 615, a warehouse application 620, one or more posting applications 630, an FDIC hold application 640, a hold application '1' 645, and hold application '2' 648. The calculation engine 605 performs insurance calculations based on a set of rules and returns a file to the data hub 610. The data hub 610 upon receiving the file from the calculation engine 605 and filters out the file to set target counts and amounts for the reconciliation process. The data hub 610 transmits the processed information to the queuing application 615 and the FDIC hold application 640. The queuing application 615 upon receiving the processed information, queues up uninsured debits and transfers the uninsured debits to the warehouse application 620. The warehouse application 620 retains information about the uninsured debits and transfers the information associated with the uninsured debits to the one or more posting applications 630, where the one or more posting applications 630 manage Statement of Record '1' 635 and statement of record '2' 638 to post balances and manage each customer's balances and statements. The Statement of Record '1' 635 may be a Statement of Record associated with balances, withdrawals, and deposits. The Statement of Record '2' 638 may be a Statement of Record associated with checking and savings accounts. In response to receiving the processed information from the datahub 610, the FDIC hold application 640 processes holds that are associated with the processed information provided by the data hub 610. The FDIC hold application 640 upon processing holds, transmits information associated with holds to the hold application '1' 645, hold application '2' 648, and the system of record 1 635 that is associated with balances, withdrawals, and deposits. The hold application '1' 645 and the hold application '2' 648 place holds on the accounts of the customers and manage intraday balances. The Statement of Record '1' 635 updates the balances in real-time and displays the restricted funds that are put on hold by the hold application '1' 645 and the hold application '2' 648. The information in the file provided by the calculation engine 605 is transmitted to multiple applications, where each of the applications utilize the information to perform a task, thereby achieving the objective to meet the FDIC regulation.

However, the FDIC regulation does not explicitly disclose any information on providing data associated with accuracy of the insurance calculations and processing. As such, currently there exists no system in place to verify the accuracy of the tasks performed by the applications. The system of the present invention as shown, provides the reconciliation application 360 that reconciles multiple applications described above. The reconciliation application 360 causes each of the applications to provide one or more entries to the reconciliation application 360 that are associated with the actions performed by each of the multiple applications. The one or more entries are represented by dotted lines in FIG. 6. For example, the queuing application 615 may queue uninsured debits based on the processed information provided by the data hub 610 and may transmit an entry associated with the action (i.e., queuing the uninsured debits). The reconciliation application then generates a single reconciliation file that comprises one or more actions taken by multiple applications and also represents the relation between each of the one or more applications. The reconciliation file generated by the reconciliation application 360 is self-explanatory and allows users to validate the accuracy of the objective achieved by the multiple applications. In some embodiments, the system of the present invention validates the accuracy. In such an embodiment, the system identifies any discrepancies that are associated with the one or more applications based on the one or more entries. For example, the system may identify a discrepancy between the hold placed by the hold application '1' 645 and the balance posted by the one or more posting applications 630 in the statement of record '1' 635. In such an embodiment, the system may notify users associated with the hold application '1' 645 and the one or more posting applications 630 about the discrepancy. Upon receiving the notification, the users may perform one or more mitigation steps to mitigate the effects of the discrepancy. In some embodiments, the system may automatically perform one or more mitigation steps upon identifying a discrepancy. For example, the system may automatically revert the balances posted by the one or more posting applications 630 to mitigate the effects of the discrepancy.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for facilitating reconciliation and correlation of work flows, comprising:
   one or more computer processors;
   a memory; and
   a processing module stored in the memory, executable by the one or more computer processors and configured to:
      identify one or more applications associated with an operation;
      crawl into the one or more applications to identify relationships between each of the one or more applications;
      generate a matrix comprising the relationships between each of the one or more applications, wherein the matrix allows for reconciliation of one or more workflows associated with the one or more applications;
      receive one or more entries from the one or more applications, wherein the one or more entries are associated with one or more actions performed by the one or more applications;
      store the one or more entries in a ledger;
      generate a single reconciliation file combining the one or more entries and the relationship;
      identify one or more discrepancies based on the one or more entries received from the one or more applications;
      generate and transmit an alert to at least one user, wherein the alert is associated with the one or more discrepancies; and
      perform one or more mitigation actions to mitigate the one or more discrepancies.

2. The system according to claim 1, wherein the processing module is further configured to receive the relationships from each of the one or more applications.

3. The system according to claim 1, wherein the processing module is further configured to transmit the single reconciliation file to one or more users.

4. A computer program product for facilitating reconciliation and correlation of work flows, comprising a non-transitory computer-readable storage medium having computer-executable instructions for:
   identifying one or more applications associated with an operation;
   crawling into the one or more applications to identify relationships between each of the one or more applications;
   generating a matrix comprising the relationships between each of the one or more applications, wherein the matrix allows for reconciliation of one or more workflows associated with the one or more applications;

receiving one or more entries from the one or more applications, wherein the one or more entries are associated with one or more actions performed by the one or more applications;

storing the one or more entries in a ledger;

generating a single reconciliation file combining the one or more entries and the relationships;

identifying one or more discrepancies based on the one or more entries received from the one or more applications;

generating and transmit an alert to at least one user, wherein the alert is associated with the one or more discrepancies; and performing one or more mitigation actions to mitigate the one or more discrepancies.

5. The computer program product according to claim 4, wherein the non-transitory computer-readable storage medium comprises computer-executable instructions for receiving the relationships from each of the one or more applications.

6. The computer program product according to claim 4, wherein the non-transitory computer-readable storage medium comprises computer-executable instructions for transmitting the single reconciliation file to one or more users.

7. A computer implemented method for facilitating reconciliation and correlation of work flows, comprising:

identifying one or more applications associated with an operation;

crawl into the one or more applications to identify relationships between each of the one or more applications;

generating a matrix comprising the relationships between each of the one or more applications, wherein the matrix allows for reconciliation of one or more workflows associated with the one or more applications;

receiving one or more entries from the one or more applications, wherein the one or more entries are associated with one or more actions performed by the one or more applications;

storing the one or more entries in a ledger;

generating a single reconciliation file combining the one or more entries and the relationships;

identifying one or more discrepancies based on the one or more entries received from the one or more applications;

generating and transmit an alert to at least one user, wherein the alert is associated with the one or more discrepancies; and performing one or more mitigation actions to mitigate the one or more discrepancies.

8. The computer implemented method according to claim 7, wherein the method comprises receiving the relationships from each of the one or more applications.

* * * * *